Patented Jan. 17, 1939

2,144,341

UNITED STATES PATENT OFFICE 2,144,341

MANUFACTURE OF HYDROGEN PEROXIDE

John C. Michalek and Edward C. Soule, Niagara Falls, N. Y., assignors to The Mathieson Alkali Works, Inc., New York, N. Y., a corporation of Virginia No Drawing. Application July 22, 1937, Serial No. 155,039

8 Claims. (Cl. 23—207)

This invention relates to an improvement in the production of hydrogen peroxide by autoxidizable substances, and more particularly to an improvement which permits the process for the production of hydrogen peroxide employing the autoxidation of organic hydrazo compounds by means of an oxygen containing gas to be carried out with a greater degree of safety.

In the production of hydrogen peroxide by means of autoxidation of aromatic hydrazo compounds, a solvent for the hydrazo compound and for the azo compound resulting from the oxidation is necessary. In the past, hydrocarbon solvents, such as benzene and toluene have been employed. These solvents are inflammable and evolve vapors which are explosive when mixed with oxygen or air. In large scale commercial operation, the use of such solvents necessarily involves serious fire and explosion hazards.

According to the present invention, organic compounds which have heretofore not been used in the production of hydrogen peroxide are employed as solvents for the hydrazo and azo compounds. These solvents have low vapor pressures and other desirable characteristics, such that their use introduces no serious fire or explosion hazard. This advantage results from the fact that, due to the low vapor pressures of the solvents, the vapors in the reaction vessels are at all times below explosive limits even when the reaction is conducted at elevated temperatures.

The organic solvents which may be employed with advantage are high boiling liquids, or low melting solids whose melting point is below the temperature of operation. A solid compound whose melting point is somewhat higher than the reaction temperature to be employed may be used in admixture with a hydrocarbon compound of a similar nature if the melting point of the mixture is below the reaction temperature. Thus for example, $\alpha$-$\beta$-di-p-tolyl ethane with M. P.=86° C. would not in itself prove to be a satisfactory solvent whereas when admixed with certain other hydrocarbons, the mixed melting point is lowered to such an extent that the mixture becomes a satisfactory liquid solvent.

When employing the process of the present invention, the oxidation reaction may be carried on at elevated temperatures, for example 60–70° C. Operation at elevated temperatures results in such further advantages as increased reaction rate, increased solubility of the hydrazo and azo compounds, and decreased viscosity of the solution. Due to the increased reaction rates made possible by the use of such solvents over those obtained with the heretofore used solvents the added commercial advantage is attained that the productivity from a given size of apparatus is increased.

The compounds most advantageously used in the practice of the present invention are hydrocarbons containing two benzene nuclei, and which are completely saturated with the exception of the benzene nuclei themselves. One of the most satisfactory groups of compounds which fall within this classification and which are used in the operation of the hydrazo-peroxide process in accordance with the present invention are the diphenyl and di-para-tolyl substituted methanes, ethanes, and propanes. Diphenyl or alkyl substituted diphenyls having comparatively short side chains may also be used singly or in mixtures in accordance with the limitations on melting points set forth above.

Compounds such as those mentioned have a good solvent power for the aromatic hydrazo and azo compounds used in the preparation of hydrogen peroxide. This high solvent power is attributed to the presence of the two phenyl or substituted phenyl groups in the solvent molecule. At the same time these phenyl or substituted phenyl groups afford considerable stability to the solvent molecule and render it more resistant to oxidation or reation with the other reagents present under the oxidation conditions existing during the operation.

It has been found that in general hydrocarbon compounds which meet the other requirements herein set forth, and which have a vapor pressure of not more than about 5 mm. at 100° C. operate successfully in the process of the present invention. Such compounds of necessity have a very low partial pressure, and the vapors which are present in an amount less than 1% by volume are well below the explosive limit, regardless of whether air or oxygen is used as an oxidizing medium. The following compounds are examples of diphenyl and ditolyl substituted methane, ethane, and propane which operate successfully individually or in mixtures as solvents in the practice of the present invention:

Diphenyl methane; di-p-tolyl methane; $\alpha,\alpha$-diphenyl ethane; $\alpha,\alpha$-di-p-tolyl ethane; $\alpha,\alpha$-diphenyl propane; $\alpha,\beta$-di-phenyl propane; $\alpha,\beta$-di-p-tolyl propane; and $\alpha,\gamma$-diphenyl propane.

The boiling points of these compounds are above 250° C. at normal pressures, and the vapor pressures are below 5 mm. at 100° C. Various other classes of hydrocarbons such as diphenyl and alkyl substituted diphenyls may also be employed provided that their melting points or the melting points of mixtures of them are below the temperatures of reaction. Various aryl hydrocarbons may also be employed, providing that their side chains are not sufficiently long or unstable to be decomposed under the oxidizing conditions of the reaction.

In the operation of the "hydrazo process" for the production of hydrogen peroxide, it is advantageous to remove the excess alkali generated during the reduction stage and prior to the oxidation stage. This may be done by washing well with water or by washing with a solution of an acid agent. In certain cases difficulty may be experienced in breaking the emulsion formed during this washing stage due to the small difference in density between the organic solution and water solution. This may be avoided by adding a salt to the wash water or to the solution of the acid agent. Sodium sulphate is an appropriate salt for this purpose and solutions of as high as 10–15% may be successfully employed. Thus the water phase is given sufficient density to render it easily separable. The amount of such salt remaining in the non-aqueous phase is negligible.

The following experimental examples of operations, according to the present invention, will serve to illustrate the successful use of the herein disclosed improvements:

Example I

A solution of 127 g. of para-azo-toluene in 1467 g. of $\alpha,\alpha$-di-p-tolyl-ethane is reduced at 60° C. by means of sodium amalgam in the presence of water. The amount of water is so restricted that a water-in-oil type emulsion is formed on agitation. The hydrazo toluene solution thus obtained is best maintained in the reduced condition by use of $N_2$ or other inert atmosphere. The hydrazo solution is separated from the spent sodium amalgam and from the caustic soda solution. Traces of caustic soda are removed by washing with water or preferably a solution of $Na_2SO_4$ of sufficient density to insure easy separation. The alkali-free solution of hydrazo toluene is then agitated with water, restricted in amount so as to form the desired strength of $H_2O_2$, in the presence of oxygen for 1 hour and 35 minutes. After the reaction has been completed the peroxide layer is separated. $H_2O_2$ solution of 34.02% by weight is obtained, the yield corresponding to 95% of theory. The peroxide is of good stability in spite of the high temperature at which the reaction occurred. The vapor pressure of the solvent is of such magnitude that there is a negligible loss in vapor phase. The vapor issuing from the apparatus is at no time capable of propagating flame. The solution of the azo compound when free from $H_2O_2$ is returned to the reduction apparatus and the process repeated.

Example II

A solution of 2-amino-5-azo toluene in $\alpha,\beta$-diphenylpropane is reduced by means of sodium amalgam in the presence of water. The resulting caustic soda layer is separated and the solution of the hydrazo compound washed to remove alkali. The neutral solution is agitated in the presence of oxygen for 30 minutes with a small amount of water. The resulting $H_2O_2$ layer is allowed to separate and the azo solution washed with water to remove $H_2O_2$ residue. The yield of $H_2O_2$ is 68% of the theory based on azo compound.

Example III

A 2% solution by weight of p-di-methyl amino azo benzene in di-phenylmethane is agitated with sodium amalgam in the presence of water until reduction is complete. The amalgam layer and caustic soda layers are separated and the residual caustic soda removed by washing with 15% $Na_2SO_4$ solution. The clear neutral solution of p-di-methyl amino hydrazo benzene is agitated with a small amount of water in the presence of oxygen. After 20 minutes the $H_2O_2$ layer is separated. The yield of $H_2O_2$ is 87% of the theory based on the amount of azo compound present.

It will be understood that the use of pure, individual organic compounds as solvents is not essential in practicing the present invention. Mixtures of such solvents, mixtures of the various solvents specifically described above for example, may be used provided the properties of the mixture conform to the stated requirements of melting point and vapor pressure.

We claim:

1. In the production of hydrogen peroxide by the oxidation of an organic hydrazo compound dissolved in an organic solvent in which the hydrazo compound and the resulting azo compound are soluble but in which the hydrogen peroxide formed is insoluble, the oxidation being effected with an oxygen containing gas, the improvement which comprises employing as a solvent for the azo and hydrazo compounds, $\alpha,\alpha$-di-p-tolyl ethane.

2. In the production of hydrogen peroxide by the oxidation of an organic hydrazo compound dissolved in an organic solvent in which the hydrazo compound and the resulting azo compound are soluble but in which the hydrogen peroxide formed is insoluble, the oxidation being effected with an oxygen containing gas, the improvement which comprises employing as a solvent for the azo and hydrazo compounds, $\alpha,\beta$-diphenyl propane.

3. In the production of hydrogen peroxide by the oxidation of an organic hydrazo compound dissolved in an organic solvent in which the hydrazo compound and the resulting azo compound are soluble but in which the hydrogen peroxide formed is insoluble, the oxidation being effected with an oxygen containing gas, the improvement which comprises employing as a solvent for the azo and hydrazo compounds a diphenyl methane.

4. In the production of hydrogen peroxide by cyclically reducing an organic azo-type compound and oxidizing the resulting hydrazo-type compound in a solvent in which the azo-type compound is soluble but in which the hydrogen peroxide formed is insoluble, the oxidation being effected with an oxygen containing gas and the reduction being effected by an alkali metal amalgam, the improvement which comprises employing a solvent for the azo and hydrazo compounds which consists essentially of at least one aromatic hydrocarbon containing two benzene nuclei which is stable under the reaction conditions, and is a liquid at the temperature of reaction, and whose vapor pressure is less than about 5 mm. at 100° C.

5. In the production of hydrogen peroxide by cyclically reducing an organic azo-type compound and oxidizing the resulting hydrazo-type compound in a solvent in which the azo-type compound is soluble but in which the hydrogen peroxide formed is insoluble, the oxidation being effected with an oxygen containing gas and the reduction being effected by an alkali metal amalgam, the improvement which comprises employing a solvent for the azo and hydrazo compounds which consists essentially of at least one diphenyl substituted hydrocarbon, which is stable under the reaction conditions, and is a liquid at the temperature of reaction, and whose vapor pressure is less than about 5 mm. at 100° C.

6. In the production of hydrogen peroxide by cyclically reducing an organic azo-type compound and oxidizing the resulting hydrazo-type compound in a solvent in which the azo-type compound is soluble but in which the hydrogen peroxide formed is insoluble, the oxidation being effected with an oxygen containing gas and the reduction being effected by an alkali metal amalgam, the improvement which comprises employing a solvent for the azo and hydrazo compounds which consists essentially of at least one ditolyl substituted hydrocarbon, which is stable under the reaction conditions, and is a liquid at the temperature of reaction, and whose vapor pressure is less than about 5 mm. at 100° C.

7. In the production of hydrogen peroxide by the oxidation of an organic hydrazo compound dissolved in an organic solvent in which the hydrazo compound and the resulting azo compound are soluble but in which the hydrogen peroxide formed is insoluble, the oxidation being effected with an oxygen containing gas, the improvement which comprises employing a solvent for the azo and hydrazo compounds which is a liquid at the reaction temperature, whose vapor pressure is less than about 5 mm. at 100° C., and which consists essentially of at least one hydrocarbon having the formula

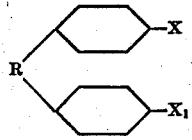

in which R is an alkyl group having not more than three carbon atoms and X and $X_1$ are radicals chosen from the class consisting of hydrogen and the methyl group.

8. In the production of hydrogen peroxide by cyclically reducing an organic azo-type compound and oxidizing the resulting hydrazo-type compound in a solvent in which the azo-type compound is soluble but in which the hydrogen peroxide formed is insoluble, the oxidation being effected with an oxygen containing gas and the reduction being effected by an alkali metal amalgam, the improvement which comprises employing a solvent for the azo and hydrazo compounds which is a liquid at the reaction temperature, whose vapor pressure is less than about 5 mm. at 100° C., and which consists essentially of at least one hydrocarbon having the formula

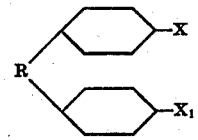

in which R is an alkyl group having not more than three carbon atoms and X and $X_1$ are radicals chosen from the class consisting of hydrogen and the methyl group.

JOHN C. MICHALEK.
EDWARD C. SOULE.